March 4, 1969  L. J. LESHINSKY  3,430,993
CONNECTOR
Filed Aug. 26, 1964

INVENTOR.
Leonard J. Leshinsky
BY
J. L. Carpenter
ATTORNEY

United States Patent Office 3,430,993
Patented Mar. 4, 1969

3,430,993
CONNECTOR
Leonard J. Leshinsky, Utica, Mich., assignor to General Motors Corporation, Detroit, Mich., a corporation of Delaware
Filed Aug. 26, 1964, Ser. No. 392,209
U.S. Cl. 287—53          7 Claims
Int. Cl. F16d 1/06, 1/10

ABSTRACT OF THE DISCLOSURE

A spline coupling in which first and second parts are secured for rotation together by meshing splines. There are radially extending locking members formed adjacent to the ends of a first series of splines on the first part which engage an external shoulder on the second part when the parts are assembled to hold the members together. Blind assembly of the parts is made possible by forming certain grooves in the second part with a depth sufficient to accommodate the passage of the locking members on the first part therethrough. After the splined portion of the first part is passed through the second part, it can be relatively rotated to align the locking members with the external shoulder and again axially moved into meshing engagement with the second part to an extent limited by the engagement of the locking members and the shoulder.

This invention relates to connectors and more particularly to connectors for releasably securing relatively movable members to each other.

This invention provides a connector for splined members which employs the splines and grooves of the members to releasably secure them to each other. Generally, the members are releasably secured by passing an externally splined portion of one member through an internally splined portion of the other member and then rotating the members relative to each other so that certain splines and grooves do not interfit to prevent the one member from being withdrawn, while other splines and grooves do interfit to releasably secure the members to each other for movement as a unit. This connector is particularly adapted to secure a rotatable member to a rotatable shaft for torque transferral therebetween.

In the preferred embodiment of this invention alternating splines of a splined first torque transmitting member have outwardly extending locking ribs disposed on their leading ends. This member is splined to a second member to prevent relative rotation of the members. Axial movement of one member relative to the other in one direction is prevented by the engagement of the locking ribs with an external shoulder on the second member.

The primary object of this invention is to provide a connector for releasably securing splined members.

Another object of this invention is to provide a connector for releasably securing splined members which may be used in relatively inaccessible places and does not require any securing means apart from the members.

Figure 1:
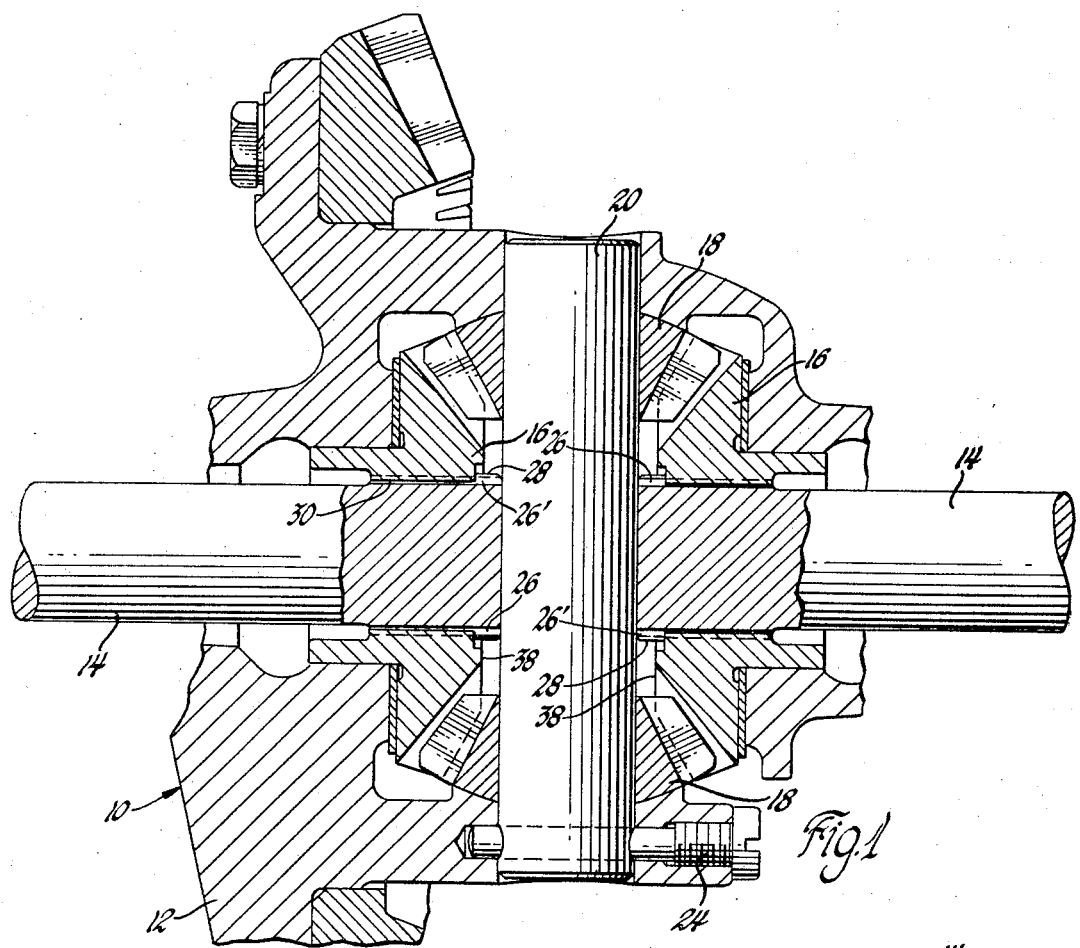
Figure 2:
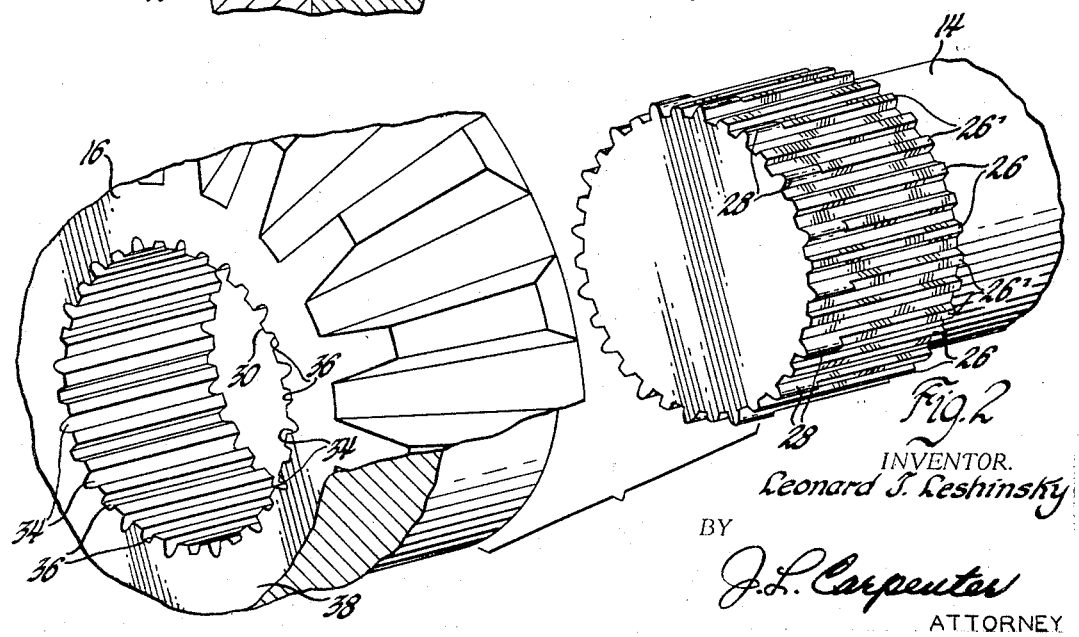

These and other objects of this invention will be apparent from the following specification and drawing wherein:

FIGURE 1 is a sectional view of a vehicle differential embodying a connector according to this invention; and FIGURE 2 is an exploded isometric view of a portion of FIGURE 1.

Referring now to the drawing, a conventional vehicle differential designated generally 10 includes a differential case 12 and axle shafts 14. Differential side gears 16 and shafts 14 are secured to each other by a connector according to this invention for rotation as a unit. Gears 16 engage differential pinions 18 which are rotatably mounted on a pinion shaft 20 which is secured to the differential case by a retaining screw 24. The construction and operation of vehicle differentials are well known and accordingly will not be further described.

The axle shaft 14 includes a number of alternating raised ribs or splines 26 and 26' spaced about the periphery of the shaft. As shown in FIGURES 1 and 2, locking portions or locking ribs 28 are formed integral with ribs 26' and are located in a zone adjacent one end of the shaft 14. These locking ribs are larger in a transverse dimension such as height as compared to the corresponding dimension of ribs 26 or 26' for a purpose which will appear below.

As shown, the ribs 26' extend from the locking ribs to terminal end portions and definite a central zone. The plain portion of shaft 14 beyond the splined portion defines a third zone which is utilized in coupling gear 16 to shaft 14 as will be described.

In the preferred embodiment of the invention the grooves 34 have a transverse dimension such as depth which is greater than the corresponding transverse dimenison of grooves 36. The grooves 34 can accommodate ribs 26 and 26' and locking ribs 28. The grooves 36 are of a transverse dimension which will also accommodate ribs 26 and 26' but cannot accommodate the locking ribs 28.

To assemble the gear 16 on the axle shaft 14, the grooves 34 are aligned with the ribs 28 and this also aligns the grooves 36 with the ribs 26. The shaft is inserted through the recess 30 until the ribs 26, 26' and 28 are free of the grooves 34 and 36 and the axially inner ends of the ribs 26 and 26' are located adjacent a face or shoulder 38 of the gear. The shaft and gear are then rotated relative to each other to align ribs 26' with the grooves 36 and the ribs 26 with the grooves 34. The shaft and gear are then moved axially of each other to insert the ribs 26' in the grooves 36 and the ribs 26 in the grooves 34 and locate the ribs 28 in engagement with shoulder 38 to prevent the shaft from being withdrawn from the gear.

To disassemble the gear and shaft, the ribs 26 and 26' are moved out of the grooves 34 and 36 and then respectively aligned with grooves 36 and 34. The shaft may then be withdrawn from the gear.

When the axle shafts and side gears are assembled in the differential case, the differential pinion shaft 20 and the locking portions 28 prevent the shafts from being moved axially in either direction.

It is to be noted that many modifications may be made in the connector of this invention. In the embodiment shown, the ribs 26' act as additional torque transferring ribs and cooperate with the ribs 26 in transferring high torque loads between the shaft 14 and the gear 16. In certain instances, one or more or all of the ribs 26' may be dispensed with and certain of the ribs 26 may also be dispensed with depending upon the degree of torque transferral between the relatively movable members. The number of grooves 34 and 36 is dependent upon the number of ribs 26, 26' and 28 although the number of grooves could be greater than the number of ribs if desired.

From the above it will be appreciated that this invention provides a straight-forward, rugged mechanism for connecting members together which connection can be easily and quickly accomplished without the use of additional fasteners or complex locking devices. Furthermore, disassembly of connected members is facilitated.

It will be understood that there are many modifications of this invention and that this invention is not to be restricted to the particular embodiment described but by the scope of the claims set forth below.

I claim:
1. In a torque transmitting assembly comprising: a first relatively rotatable member having a plurality of radially extending locking ribs and a plurality of radially extending torque transferring ribs parallel thereto, said locking ribs being located near one end of said first member and extending radially beyond said torque transferring ribs, a second relatively rotatable member having a plurality of first radially extending grooves with dimensions receptive of said locking ribs and said torque transmitting ribs and having a plurality of second radially extending grooves with dimensions receptive only of said torque transferring ribs, said second member including a shoulder adjacent said grooves, said first member having its locking ribs and its torque transferring ribs insertable within said first and second plurality of grooves of said second member and being movable through said grooves to a position adjacent to said shoulder, said members being rotatable relative to each other to align said locking ribs with said second grooves and align said torque transmitting ribs with said first grooves, said members being axially movable relative to each other in one direction to form an assembly in which said torque transferring ribs are disposed within said first mentioned grooves to engage the side walls thereof to lock said members to each other for torque transferral therebetween and to engage the ends of said locking ribs with said shoulder to prevent further relative axial movement in said one direction.

2. The combination recited in claim 1 wherein said torque transferring ribs are axially aligned with at least certain of said locking ribs.

3. The combination recited in claim 1 wherein said locking ribs are axially aligned with certain of said torque transferring ribs and others of said torque transferring ribs are located intermediate said locking ribs and wherein said second member includes second grooves receptive only of said others of said torque transferring ribs upon movement of said locking ribs into engagement with said shoulder.

4. The combination comprising: a first member having a first axial rib located in a central transverse zone, a second axial rib with a larger transverse dimension than said first rib and located in one side transverse zone at one side of said central zone, and another side transverse zone at the other side of said central zone; a second member locked in said first member having first and second axial grooves sized to slidably receive respectively said first rib and said second rib for relative axial movement of said members and including a transverse shoulder adjacent said first groove, said first groove being sized to receive only said first rib and said second groove being sized to receive both said first and second ribs, said first member having its ribs insertable within said grooves of said second member and movable through said grooves to position said another side zone opposite said grooves, said another side zone being free of said grooves for relative transverse movement of said members when said another side zone is opposite said grooves to locate said first rib in alignment with said second groove and locate said second rib in alignment with said first groove, said first rib being in said second groove and having sliding contact with both side walls of said second groove to prevent relative transverse movement between said first and second members and said second rib being in engagement with said shoulder to prevent axial movement in one direction of said first member relative to said second member.

5. The combination of claim 4 wherein said second axial rib is of a greater height than said first axial rib.

6. In combination, a first part having first and second parallel rib members disposed thereon, one of said rib members having a height greater than the height of the other of said rib members and located near the end of said first part, a second part having first and second grooves formed therein, said first groove being of a depth to receive only the lower of said rib members, said second groove being dimensioned to receive either of said rib members, external shoulder means on said second member for contacting an end portion of said higher of said rib members to retard movement of said first part relative to said second part in one axial direction, said first part having its first and second rib members insertable within corresponding first and second grooves and being movable in one direction through said grooves to a position adjacent said shoulder, said parts then being rotatable relative to each other to locate said higher rib members in alignment with said second groove and said lower of said rib members in alignment with said first groove, and said first and second parts being relatively movable in an opposite direction to form an assembly with said higher rib members engaging said shoulder and said lower rib members positioned in said second groove.

7. In a torque transmitting assembly having a drive and a driven member, one of said members being a first member having a plurality of torque transmitting ribs and a plurality of locking ribs parallel thereto and rigidly formed on said one member, said locking ribs having a height greater than the height of said torque transmitting ribs, said locking ribs having contact surfaces formed by the inner ends thereof, said locking ribs being disposed in a zone adjacent to one end of said first member and adjacent to one end of said torque transmitting ribs, another of said members being a second member having a plurality of first grooves dimensioned to receive only said torque transmitting ribs and a plurality of second grooves parallel to said first grooves with dimensions receptive of said locking ribs, said first and second grooves being dimensioned to receive said torque transmitting ribs, said second member having external shoulder means for engaging said contact surfaces of said locking ribs, and said first member being connected to said second member by the engagement of said torque transmitting ribs with the side walls of said second grooves for transmitting torque from said drive member to said driven member and being connected by the engagement of said contact surfaces of said locking ribs with said shoulder means to prevent the axial movement in one direction of said first member relative to said second member.

References Cited

UNITED STATES PATENTS

| 99,508 | 2/1870 | Williams | 24—221 |
|---|---|---|---|
| 2,625,415 | 1/1953 | Smith | 287—53 |
| 2,886,358 | 5/1959 | Munebach | 287—53 |

FOREIGN PATENTS 67,476  5/1940  Czechoslovakia.

MARION PARSONS, Jr., *Primary Examiner.*

A. KUNDRAT, *Assistant Examiner.*

U.S. Cl. X.R.

24—221